Figure 1:
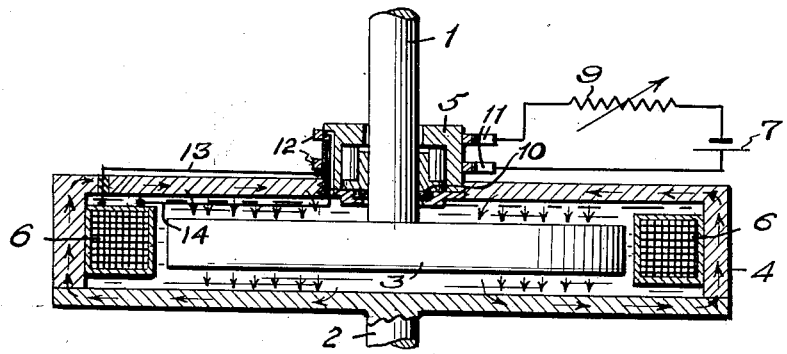

Nov. 20, 1951  J. RABINOW  2,575,360
MAGNETIC FLUID TORQUE AND FORCE TRANSMITTING DEVICE
Filed Oct. 31, 1947  3 Sheets-Sheet 1

Inventor
Jacob Rabinow
By J. H. Church, W. E. Thibodeau + M. L. Libman
Attorneys Nov. 20, 1951 J. RABINOW 2,575,360
MAGNETIC FLUID TORQUE AND FORCE TRANSMITTING DEVICE
Filed Oct. 31, 1947 3 Sheets-Sheet 2
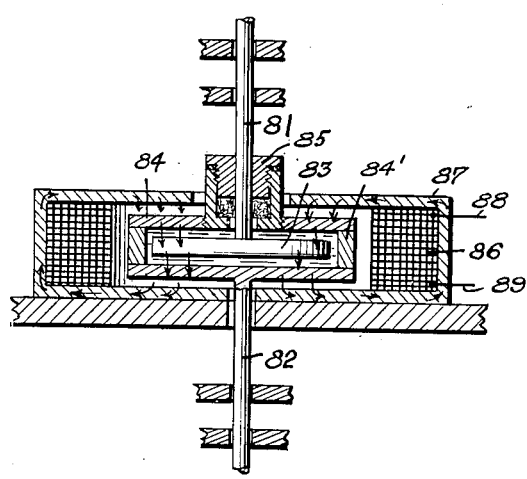
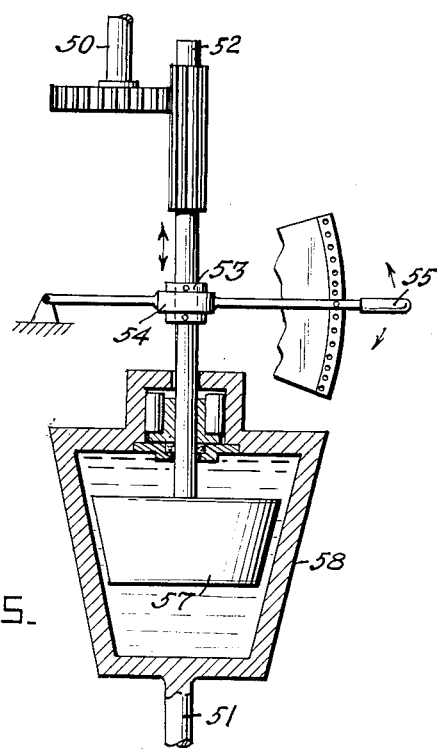
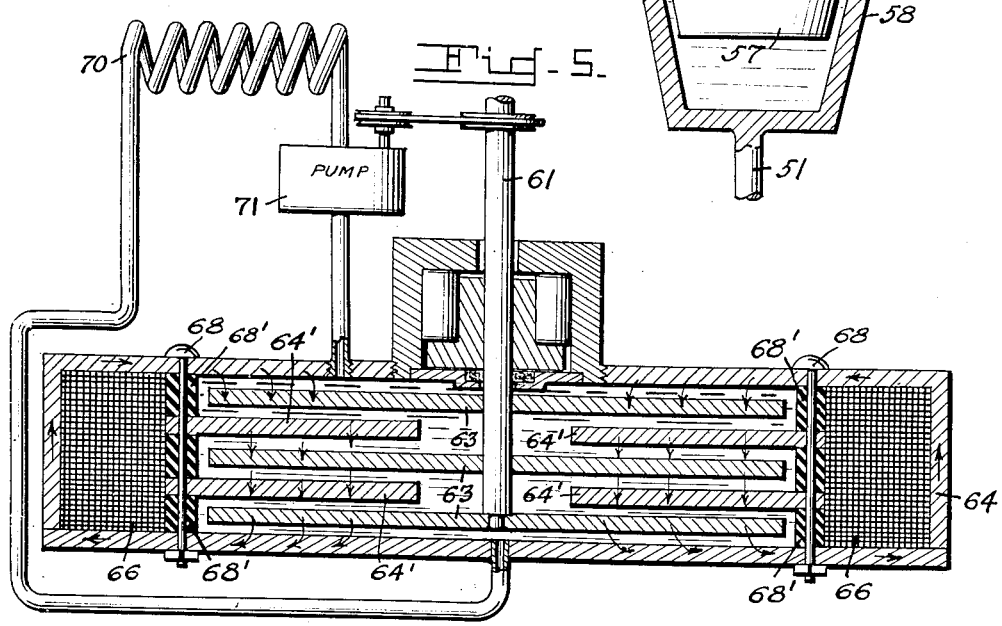
Inventor
Jacob Rabinow
By J. H. Church, W. E. Thibodeau & M. L. Libman
Attorneys Nov. 20, 1951  J. RABINOW  2,575,360
MAGNETIC FLUID TORQUE AND FORCE TRANSMITTING DEVICE
Filed Oct. 31, 1947  3 Sheets-Sheet 3
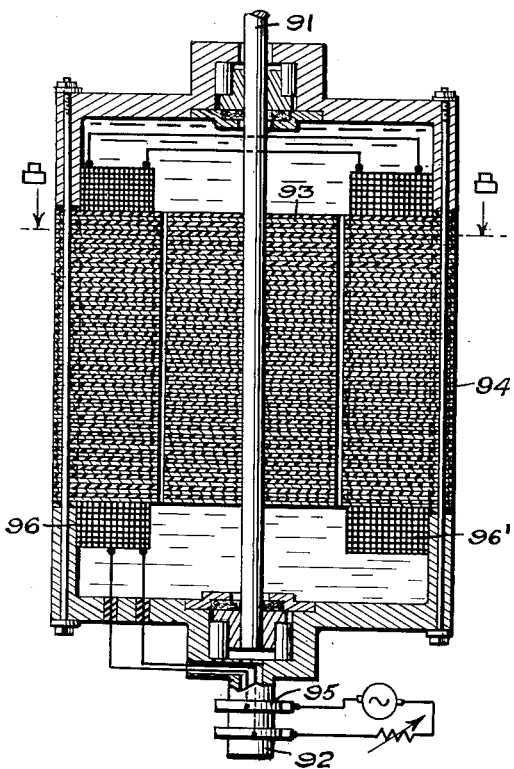
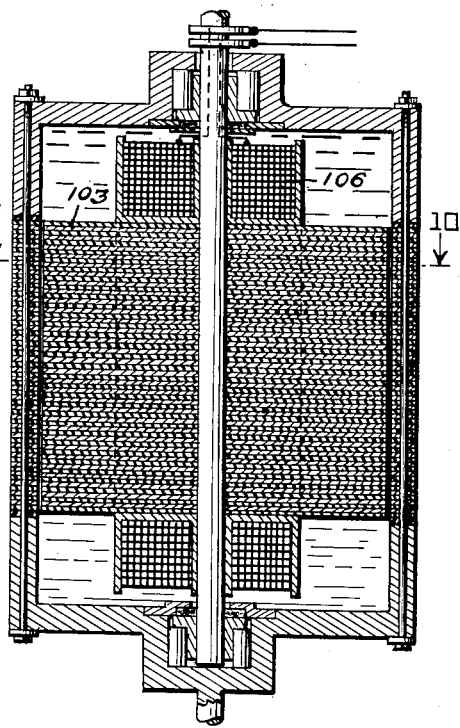
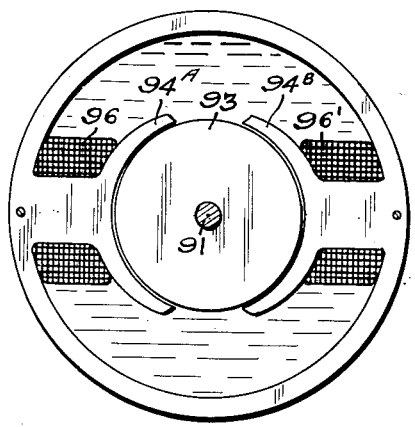
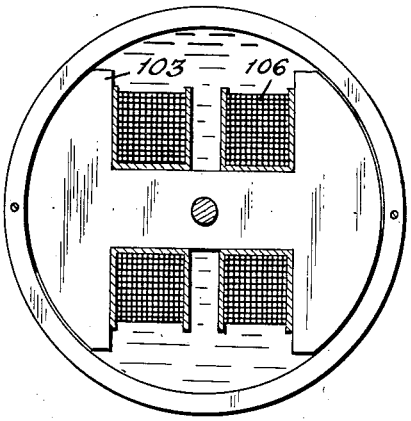
Inventor
Jacob Rabinow Patented Nov. 20, 1951

2,575,360

UNITED STATES PATENT OFFICE 2,575,360

MAGNETIC FLUID TORQUE AND FORCE TRANSMITTING DEVICE

Jacob Rabinow, Washington, D. C., assignor to the United States of America as represented by the Secretary of the Army Application October 31, 1947, Serial No. 783,426

24 Claims. (Cl. 192—21.5)

(Granted under the act of March 3, 1883, as amended April 30, 1928; 370 O. G. 757)

This invention relates to electromagnetically controlled torque-applying devices, and more specifically to a device for forming a drive or force connection between two independently rotatable units, said device having one of its objects to provide a controllable slip, non-wearing drive connection between said elements.

Another object this invention is to provide a simple device which may be actuated to serve as either clutch or as a brake upon the application of a magnetic field which may be controlled by a remote current source.

A principal object of the invention is to provide an electromagnetically controlled clutch or brake with substantially no wearing parts, capable of locking two relatively movable rotating elements together with great force and with features of advantage over conventional magnetic eddy current clutches or brakes including the ability to lock in with substantially its maximum torque even at the lowest (or zero) relative speed; perfectly smooth and chatterless operation when there is relative motion between the rotating elements; and substantially constant torque at all slipping speeds within a wide range. The term "relative motion" as applied to the rotating elements and as hereinafter used is to be treated in its broadest sense, as for example if there be two elements or shafts each independently rotatable and if one element has an angular velocity of A radians per second while the other element has an angular velocity of B radians per second and B is less than A but in the same direction, then the relative angular velocity is A—B radians per second, and the relative motion per second is A—B radians. It of course follows that when the elements are locked together A equals B and there is no relative motion. The subject clutch has similar advantages over friction clutches including substantially no wearing parts, great cheapness and simplicity of construction, and simple electrical control from a remote point.

Other advantages of the improved clutch include very fast response to quick changes in control current; operation requiring only a low potential source of electric power such as can be supplied by a storage battery, and ability to operate on either alternating or direct current.

Figures 2, 3:
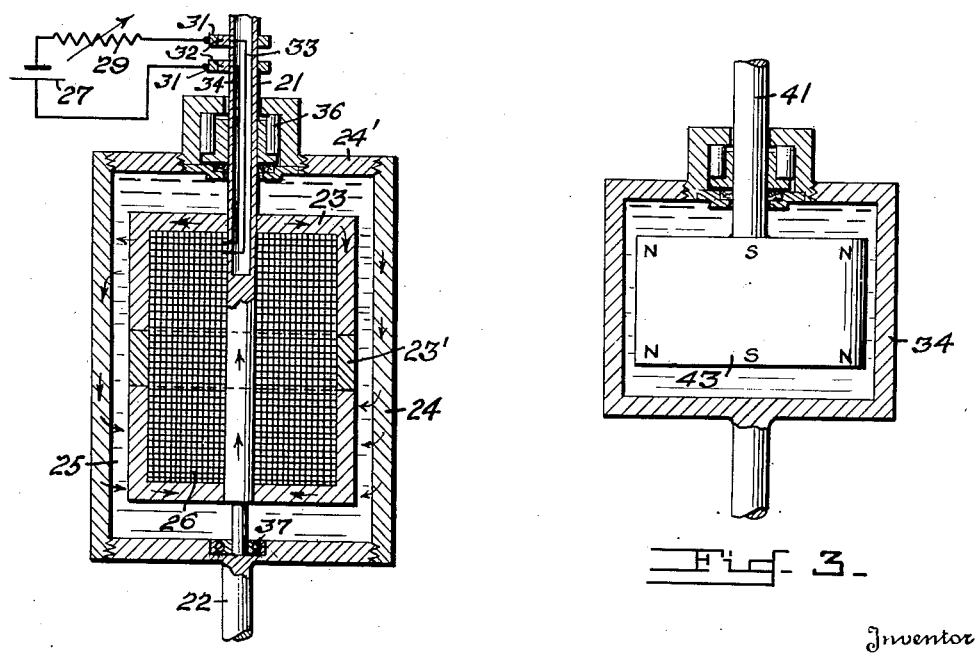

Other objects and advantages will be apparent from the following description in which:

Fig. 1 is a schematic, axial cross-sectional view of a device illustrating the principles of my invention, Fig. 2 is a schematic axial cross-sectional view of an alternative construction, Fig. 3 is an axial schematic sectional view of an embodiment of my invention employing permanent magnet, Fig. 4 is an alternative construction according to my invention employing both magnets and mechanical torque controlling means, Fig. 5 is an axial schematic cross-sectional view of an embodiment of my invention operative as a brake, Fig. 6 is an axial schematic sectional view of a clutch embodying my invention and employing a stationary coil, Fig. 7 is an axial schematic sectional view of an embodiment of my invention suitable for use with alternating current, Fig. 8 is a transverse sectional view taken on line 8—8 of Fig. 7, Fig. 9 is an axial schematic sectional view of a modification of the embodiment shown in Fig. 7, and Fig. 10 is a transverse sectional view taken on line 10—10 of Fig. 9.

The term "mechanical force" as it hereinafter appears in the specification and claims denotes that which tends to accelerate a mass by direct interaction between physical bodies, as distinguished from electrical forces.

My invention is based upon the fact that if two slightly spaced surfaces of paramagnetic materials are connected by a mixture of a liquid and a large number or a mass of finely divided relatively movable contiguous discrete paramagnetic particles, such as soft iron particles; and a magnetic field is applied so that the particles are included in the magnetic circuit between the surfaces a substantial component of the field will be perpendicular to the surfaces at the areas of contact between the particles and the surfaces because of the fundamental law of physics that the potential energy of any system must be at a minimum; and the contact pressure between the particles inter se and between the particles and the surfaces will build up, whereby the surfaces will tend to lock together so as to transmit force between them as long as the magnetic field continues to exist.

The relatively movable contiguous discrete particles are free to move or flow with respect to each other and with respect to the spaced surfaces and can be considered as separate entities in actual contact and free to move under the condition of no field excitation. When the field is energized the particles are attracted one to the other and in that way the adhesive consistency of the mass of particles is increased so that resistance is offered to the relative motion of the particles.

This principle is exemplified in Fig. 1 in which two independently rotatable shafts 1 and 2 are mounted for rotation in any suitable bearings or journals (not shown). The top shaft 1 has secured thereto a disc 3, while the bottom shaft 2 has secured thereto a cup 4 containing a magnetic fluid mixture consisting of a suitable fluid vehicle and a quantity of finely divided paramagnetic particles such, for example, as commercially available soft iron dust sold by General Aniline and Film Company, New York, as "Carbonyl Iron Powders," of which grade E, 8 microns average size, has been found satisfactory. The percentage of dust may be varied within fairly wide limits, but I have found a mixture containing approximately 50% by volume of dust to give satisfactory results. A coil or field winding 6 is mounted as shown so that when the coil is energized by an electric current, magnetic flux will be produced in the space between elements 3 and 4 as indicated by the arrows. It will be understood that in practice this space will be dimensioned so that it provides the shortest return path for the flux, e. g. by making shaft 1 of non-magnetic material or else by making the section 5 of non-magnetic material, or otherwise suitably designing the magnetic circuit for efficient operation in accordance with known good practice. Although the clutch is operative without a fluid vehicle using only the iron particles, I have found that the operation is greatly improved by the use of a fluid mixed with the iron particles. I have found a light lubricating oil to be suitable for this purpose, but, in general, any liquid may be used which has suitable mechanical properties to make the mixture act as a rather viscous fluid at all contemplated operating temperatures.

The non-magnetic section 5 which bears the slip ring is schematically shown as housing a bearing for that end of the cup 4 which surrounds shaft 1, and a packing 10 is schematically shown for confining the magnetic fluid in the cup 4 and for keeping it away from the bearing. It is obvious, however, that these details can be widely varied according to the dictates of the particular design employed and in accordance with the principles of good design and mechanical practice.

A battery 7 is shown for supplying current to field winding or coil 6 and this current may be controlled by means of rheostat 9 and fed to the coil 6 by means of brushes 11 and slip rings 12 connected to leads 13 and 14 respectively, which lead to the coil terminals.

When the coil is energized, it is found that a strong coupling force exists between the two shafts 1 and 2. For example, if 1 is a driven shaft which is rotating, and the magnet is not energized, shaft 2 will be stationary. If current is now gradually increased in coil 6, a definite torque will be smoothly developed between the two members 3 and 4, the value of which, other things being equal, will depend on the current in coil 6. If the torque developed in the clutch is greater than that required by the load on the shaft 2, the two elements 3 and 4 will be "locked" together in that they will rotate at the same speed. It is a feature of my invention that the driven shaft comes up to its maximum speed very smoothly and without chatter. If the maximum torque that the clutch (because of its limited physical and electrical parameters) can develop is less than that required to make shaft 2 rotate as fast as shaft 1, there will be relative slipping between the two shafts, but at all slipping speeds, the clutch will transmit substantially the same amount of torque. In other words, under slipping conditions the clutch acts substantially as a constant-torque transmission system. This constant-torque value is also the maximum torque that the clutch can transmit without slipping. At high slipping speeds, there is also a little viscous drag which adds to the torque, but with smooth disc surfaces, this is usually negligible.

It is obvious that the same system can also act as a brake if one of the members is held fixed. Under these conditions there will be no effective braking action until coil 6 is energized at which time a retarding torque will be developed which will exert a braking action on the rotating shaft.

Fig. 2 shows an alternative construction embodying my invention. In this case the shafts are shown at 21 and 22 respectively. Shaft 21 has an inner drum 23 (corresponding to disc 3 in Fig. 1) rigidly fastened to it. This drum 23 is composed of a paramagnetic material such as iron except for a ring 23' of brass or other non-magnetic material, brazed or otherwise secured thereto about the "equator" of the drum, i. e., midway between the ends of the drum, as shown. The purpose of this brass insert is to provide a magnetic gap between the two halves of the drum without loss of mechanical rigidity or strength. Secured to shaft 22 is outer drum 24 so dimensioned that only a very small gap 25 exists between its inner surface and the outer surface of drum 23, this gap being much smaller than the distance between the two halves of drum 23; i. e. smaller than the width of the brass ring 23'. End plate 24' may be made so that it may be separately screwed on to the body of the cup 24 to form the outer drum, or the drum may be made in one piece as by welding, or fastened in any other known manner. Coil 26 is wound round shaft 21 to form a solenoid of which the shaft is the magnetic core. Insulated leads 33 and 34 lead from the coil 26 to slip rings 32 on shaft 21. Brushes 31 feed current from battery 27 through control rheostat 29 so that the field winding 26 can be energized from an external source. It will be understood that the battery and rheostat are used as conventional symbols to represent any suitable source of current and means for controlling said current. It will be noted that the far end of the drum is supported on the opposite shaft at bearing point 37 to form a mechanically strong and rigid structure. Bearings 36 and 37 should include bronze bushings to insure an adequate magnetic gap between each drum and the opposite shaft, or else the ends of drum 24 may be of non-magnetic material for the same purpose. The space between the two drums is filled with a magnetic fluid mixture as before.

When coil 26 is energized, the flow of magnetic flux will be from the core 21 out radially from the end of one half-drum 23 to the cylinder walls; thence, across the small gap, through the magnetic fluid mixture to the outer drum 24; back from 24 to the other half-drum 23 (since the magnetic gap 23' is much greater than the magnetic gap between the two drum cylinders); radially inward at the end of the other half drum 23 and back to the core 21. The magnetic clutching or braking action is the same as in Fig. 1 but the action is more efficient in that the magnetic torque is developed near the periphery of the drums, which gives the maximum possible torque-arm, while the coil 26 occupies the center portion of the structure, where little torque can be developed in any case.

Instead of a field winding I can use a permanent magnet as in Fig. 3 where rotor 43, associated with shaft 41 is made of a permanently magnetizable material such, for example, as that alloy of aluminum, nickel and cobalt known to the trade as "Alnico," which is strongly magnetized at spaced areas as indicated to produce permanent alternate north and south poles around the periphery of the cylinder. Flux will then flow across the space between cylinder 43 and drum 34 as indicated in Fig. 3. This space is filled with magnetic fluid mixture as before. The action is similar to that previously described except that the force between the two shafts cannot be electrically controlled as before. The device will therefore constitute a constant torque transmission at all slipping loads or whenever the maximum holding torque is exceeded.

If, with a permanent magnet arrangement, it is desired to control the transmitted force, the gap between the two clutch faces may be varied as schematically shown in Fig. 4 by providing means for moving the two rotating members 51 and 52 axially relative to each other. Fixed collar 53 on shaft 52 rotates freely within annulus 54 of control lever 55. It will be obvious that movement of lever 55 varies the gap between members 57 and 58 to vary the force transmitted between shafts 50 and 51, thus providing a mechanical equivalent of rheostat 9 of Fig. 1. Rotor 57 is magnetized similarly to rotor 43 of Figure 3.

Fig. 5 is a schematic showing of a brake employing the principles described in Fig. 1. The space efficiency is here improved by using a number of discs to increase the opposed magnetic surfaces. In this case the device is shown as a brake with the reacting member 64 held stationary. Instead of the single disc 3 in Fig. 1, a plurality of discs 63 are associated with shaft 61 and between these discs and closely spaced therefrom extend a number of washers or perforated discs 64' associated with stationary member 64 to which they are fastened in any suitable fashion as by means of brass bolts 68 together with non-magnetic space collars 68'. When there is no current in the coil 66, shaft 61 is free to rotate but when the coil is energized, a field is set up as shown by the arrows, which produces the same effect as in Fig. 1 except that this effect is multiplied by the number of plates employed, assuming the same field strength as before and the same disc diameter.

Since a brake must dissipate heat, a cooling system is provided which circulates the magnetic fluid mixture through a cooling coil 70. A pump 71 is provided for this system which may be driven from shaft 61 as shown schematically in Fig. 5. This circulation has also the advantage of tending to keep the magnetic fluid mixture in a homogenous condition and thus minimizes any tendency of the solid particles to settle out.

Fig. 6 shows a modification in which two relatively rotatable shafts 81 and 82 can be magnetically coupled for transmission of power from one to the other by the action of a stationary coil 86. In this case the cup 84 having a non-magnetic insert 84' surrounds disc 83 and is filled with the magnetic fluid mixture as before. A packing nut 85 may be employed to contain the fluid in the cup. For producing the magnetic field, a stationary coil 86 having a magnetic support element 87 is employed. Leads 88 and 89 are for use for any suitable controllable current supply. The flux distribution is indicated by arrows as before.

Although the field winding is stationary and the clutch plates 83 and 84 rotate when the clutch is energized, no eddy currents will be induced in the discs by this relative motion, due to the radial symmetry of the structure and the smooth plate faces which cause the flux traversed by any given point on any of the relatively rotating discs to remain constant so that there are no flux changes and therefore no induced currents. There may be some eddy currents induced in the iron particles of the magnetic fluid mixture, but as these particles are exceedingly minute, there are no long current paths and the effect is the same as that of exceedingly well laminated iron so that the eddy currents induced in the magnetic fluid mixture will be quite negligible. The chief advantage of this modification lies in the elimination of slip rings and brushes.

Figs. 7 and 8 show a modification similar in principle to those previously shown but suitable for use for alternating current. To prevent excessive eddy current loss, the rotors 93 and 94, fixed to shafts 91 and 92 respectively, are of conventional laminated construction. The coils 96 and 96' are wound to produce north and south poles at 94A and 94B respectively (Fig. 8). When either alternating current or direct current is passed through the field winding via the usual slip rings 95, the magnetic fluid being present as in the other modifications, the same clutching or force transmitting action as previously described will occur.

Figs. 9 and 10 show a modification similar to Figs. 7 and 8 except that the inner member 103 bears the field winding instead of the outer member, through which a return flux path is provided. Here, as in Fig. 2, putting the winding at the center permits a longer torque-arm for a given size of structure.

While I have described the principle of operation of my invention, together with the apparatus which I now consider to represent the best embodiments thereof, it will be understood that the apparatus disclosed is only illustrative and that the invention can be carried out by means of many other modifications and arrangements which will be apparent to those skilled in the art. The invention is therefore not intended to be limited to the present modifications shown but its scope is defined by the appended claims.

The invention described in the specification and claims may be manufactured and used by or for the Government for governmental purposes without the payment to me of any royalty thereon.

I claim:

1. A device for transmitting torque comprising two closely spaced adjacent elements, a mass of relatively movable contiguous discrete ferromagnetic particles in the space between said elements, and means for subjecting said elements and particles to a magnetic field of sufficient intensity to cause such attraction between said particles and between at least some of said particles and respective ones of said elements whereby the adhesive consistency of the said mass is increased for the transmission of torque through said mass.

2. The invention according to claim 1 wherein said field is stationary with respect to one of said elements.

3. The invention according to claim 1 wherein said elements are both movable with respect to said magnetic field.

4. A device for controlling the transmission of torque from one element to a closely spaced adjacent relatively movable element including therebetween a mass of contiguous relatively movable discrete paramagnetic particles comprising enclosure means for maintaining said mass of contiguous relatively movable discrete paramagnetic particles in the space between said elements, means for subjecting said elements and particles to a magnetic field to produce a coupling force between said elements, and means for varying the strength of said field to control said coupling force.

5. A device for controlling the transmission of torque from one element to an adjacent relatively movable element comprising members fixed to said elements respectively and having substantial, opposed, closely spaced surface areas separated by a fixed distance, a mass of contiguous relatively movable discrete paramagnetic particles in the space between said surface areas and means for creating a magnetic field between said opposed members and including said particles, to produce a coupling effect between said spaced members said magnetic field being of sufficient intensity to cause such attraction between said particles and between at least some of said particles and respective ones of said elements whereby the adhesive consistency of the said mass is increased for the transmission of torque through said mass.

6. Means for transmitting torque between relatively rotatable members comprising a rotatable element, a paramagnetic member secured thereto for rotation therewith, a second and independently rotatable element, substantially coaxial with said first element, a second paramagnetic member secured thereto for rotation therewith, said members having substantial surfaces of revolution opposed to and slightly spaced from each other, a mass of contiguous relatively movable discrete paramagnetic particles retained in the space between said opposed surfaces and means for producing a magnetic field between said surfaces of sufficient intensity to cause such attraction between said particles and between at least some of said particles and respective ones of said elements whereby the adhesive consistency of the said mass is increased for the transmission of torque through said mass.

7. The invention according to claim 6 in which said particles are mixed with a non-magnetic fluid.

8. The invention according to claim 7 in which said particles consist of iron powder and said fluid is a light oil.

9. The invention according to claim 8 in which said magnetic field producing means comprise a field winding positioned to produce a magnetic field across said space when energized, and means for energizing said winding from a stationary source, said means including a source of electric current and current controlling means.

10. The invention according to claim 9 wherein said current controlling means includes means for varying the strength of said current from a maximum to zero.

11. The invention according to claim 10 wherein said first member comprises a disc and said second member comprises an inclosure for said disc and said discrete particles.

12. The invention according to claim 11 wherein said field winding is coaxial with said element and located adjacent the periphery of said disc and within said inclosure, whereby said inclosure and disc define a magnetic circuit for said field winding.

13. The invention according to claim 11 wherein said field winding is coaxial with said elements and located adjacent to and outside of the periphery of both said disc and inclosure, and is mounted independently of rotation thereof.

14. Means for transmitting torque between relatively rotatable members comprising a first rotatable element, a first paramagnetic member secured thereto for rotation therewith, a second element substantially coaxial with said first element, a second paramagnetic member secured thereto, said members having substantial surfaces of revolution opposed to and slightly spaced from each other, a mass of contiguous discrete relatively movable paramagnetic particles in the space between said opposed surfaces, means for producing a magnetic field between said surfaces, said first paramagnetic member comprising a number of spaced discs coaxial with and fixed to said first rotatable element, said second paramagnetic member comprising a number of washers coaxial with and lying between said discs and fixed to said second element, said washers and discs being arranged alternately to define a plurality of said opposed and spaced surfaces of revolution.

15. Means for transmitting torque between relatively rotatable members comprising a first rotatable element, a first paramagnetic member secured thereto for rotation therewith, a second and independently rotatable element substantially coaxial with said first element, a second paramagnetic member secured thereto for rotation therewith, said members having substantial surfaces of revolution opposed to and slightly spaced from each other, a mixture of contiguous discrete paramagnetic particles and light oil in the space between said opposed surfaces, and means for producing a magnetic field between said surfaces, said field producing means comprising a field winding positioned to produce a magnetic field across said space when energized, means for energizing said winding from a stationary source said means including a source of electric current, means for varying the current from a maximum to zero, said first member comprising a drum, and said second member comprising an enclosure for said drum and for said discrete particles.

16. The invention according to claim 15 wherein said drum is divided into two magnetically separated sections by non-magnetic annulus so dimensioned as to provide a greater magnetic gap between said sections than between said opposed surfaces, said field winding being positioned within and coaxial with said drum so that each of said sections comprises an opposite magnetic pole of said field winding.

17. The invention according to claim 15 wherein the round surface of the drum is divided into magnetically separated substantially cup-shaped sections by non-magnetic axial gaps, said field winding being positioned effectively within said gaps and across the ends of said drum so that each section of said drum comprises an opposite magnetic pole of said field winding.

18. The invention according to claim 15 wherein said second member includes two projecting pole members terminating at diametrically disposed surfaces of revolution adjacent the curved surface of said drum, and said field winding comprising coils for said pole members.

19. Means for transmitting torque between relatively rotatable members comprising a first rotatable element, a first paramagnetic member secured thereto for rotation therewith, a second and independently rotatable element substantially coaxial with said first element, a second paramagnetic member secured thereto for rotation therewith, said members having substantial surfaces of revolution opposed to and slightly spaced from each other, a mass of contiguous discrete relatively movable paramagnetic particles in the space between said opposed surfaces, and magnetic field producing means comprising permanently magnetised areas on at least one of said opposed surfaces.

20. The invention according to claim 19 including nonrotating means for varying the distance between said opposed surfaces to control the effective strength of the magnetic field in the space between said surfaces.

21. Means for transmitting torque from one element to an adjacent relatively movable element spaced therefrom, comprising a sufficient mass of contiguous ferromagnetic particles to extend across said space and contact both said elements, means for confining said mass of particles in said space, means for creating a magnetic field between said members and including said particles, said magnetic field being so oriented that a substantial component thereof is perpendicular to the surfaces of said elements at the areas of contact between said particles and said elements, whereby a substantial coupling effect is produced by contact pressures between adjacent particles and also between some of said particles and said surfaces due to the magnetic attraction among said particles and between said particles and said surfaces.

22. The invention recited in claim 21, including means for varying the intensity of the magnetic field so as to correspondingly alter the particular contact pressures to control the coupling effect between said elements.

23. A device for transmitting motion comprising two closely spaced adjacent elements arranged for rotation, a mass of relatively movable contiguous discrete paramagnetic particles in the space between said elements and means for subjecting said elements and particles to a magnetic field of sufficient intensity to cause such attraction between said particles and between at least some of said particles and respective ones of said elements whereby the adhesive consistency of the said mass is increased for the transmission of rotative motion through said mass.

24. A device for transmitting mechanical force comprising two elements having closely spaced substantially parallel surfaces, said elements being arranged for relative motion, said motion being substantially parallel to said surfaces, a mass of relatively movable contiguous discrete paramagnetic particles in the space between said elements and means for subjecting said elements and particles to a magnetic field of sufficient intensity to cause such attraction between said particles and between at least some of said particles and respective ones of said elements whereby the adhesive consistency of the said mass is increased for the transmission of mechanical force between said elements through said mass, said force to oppose said motion.

JACOB RABINOW.

REFERENCES CITED

The following references are of record in the file of this patent:

UNITED STATES PATENTS

| Number | Name | Date |
| --- | --- | --- |
| 711,123 | Rhoades | Oct. 14, 1902 |
| 774,922 | Troy | Nov. 15, 1904 |
| 811,654 | Murphy | Feb. 6, 1906 |
| 1,814,891 | Bing | July 14, 1931 |
| 1,910,270 | Whiteside | May 23, 1933 |
| 2,011,408 | Jacobs | Aug. 13, 1935 |
| 2,106,882 | Betz | Feb. 1, 1938 |
| 2,216,600 | Moore | Oct. 1, 1940 |
| 2,300,223 | Hottenroth, Jr. | Oct. 27, 1942 |
| 2,417,347 | Brown | Mar. 11, 1947 |
| 2,417,850 | Winslow | Mar. 25, 1947 |
| 2,428,471 | Pruitt et al. | Oct. 7, 1947 |

FOREIGN PATENTS

| Number | Country | Date |
| --- | --- | --- |
| 482,497 | Great Britain | Mar. 30, 1938 |
| 261,748 | Switzerland | Sept. 1, 1949 |